United States Patent [19]

Koether et al.

[11] Patent Number: 4,911,068
[45] Date of Patent: Mar. 27, 1990

[54] COOKING APPARATUS

[75] Inventors: Bernard G. Koether, Westport; Mario G. Ceste, Sr., Stratford, both of Conn.

[73] Assignee: Food Automation-Service Techniques, Inc., Stratford, Conn.

[21] Appl. No.: 159,842

[22] Filed: Feb. 24, 1988

[51] Int. Cl.⁴ ..................... A47J 27/092; A47J 27/09
[52] U.S. Cl. ......................................... 99/325; 99/330; 99/332; 99/403; 426/438
[58] Field of Search ............. 426/231, 233, 438, 439; 99/330, 325, 335, 332, 333, 403

[56] References Cited

U.S. PATENT DOCUMENTS

| | | | |
|---|---|---|---|
| 3,635,722 | 1/1972 | Moore | 426/438 |
| 3,655,411 | 4/1972 | Albright | 99/330 |
| 3,932,675 | 1/1976 | Main | 426/438 |
| 4,278,872 | 7/1981 | Koether et al. | 99/330 |
| 4,282,423 | 8/1981 | Volz | 99/330 |
| 4,499,357 | 2/1985 | Kojima | 99/325 |
| 4,585,925 | 4/1986 | Andre | 99/335 |
| 4,608,260 | 8/1986 | Andre | 426/233 |
| 4,636,949 | 1/1987 | Longabaugh | 99/332 |
| 4,682,013 | 7/1987 | Andre et al. | 99/330 |
| 4,688,475 | 8/1987 | Witt et al. | 99/325 |
| 4,742,455 | 5/1988 | Schreyer | 99/325 X |

Primary Examiner—Stephen Marcus
Assistant Examiner—Christine A. Peterson
Attorney, Agent, or Firm—Felfe & Lynch

[57] ABSTRACT

Cooking apparatus, for example, a pressure fryer having a closed cooking vat, which includes a pressure-control system for terminating pressure introduction into the fryer and for releasing pressure therein slightly before the cooking cycle is complete to deter an operator from opening the cooking vat before pressure is released therefrom.

5 Claims, 3 Drawing Sheets

COOKING APPARATUS

This invention relates to cooking apparatus and, more particularly, to cooking apparatus preferably of the type used in a fast food restaurant including a closable cooking vat, for example, for cooking potato fries in shortening or cooking oil under pressure.

Heretofore, in a conventional pressure fryer, a solenoid valve is actuated at the start or during some part o the cooking cycle under the control of a microcomputer. Pressure is maintained until the end of the cooking cycle. The cooking vat has a closable lid which should include a safety mechanism. However, the safety mechanism or catch may release while there is pressure in the vessel in the event that the vessel has a vent clogged, for example, by crumbs in the vent port. Also, the solenoid valve may stick slightly with the result that the operator forces the lid open while pressure is still being introduced into the cooking vessel. Accordingly, an operator may be injured by pressurized cooking oil vapor.

It is an object of the present invention, therefore, to provide a new and improved cooking apparatus which avoids one or more of the disadvantages and limitations of prior such apparatus.

It is another object of the invention to provide a new and improved cooking apparatus which deters an operator from opening the cooking vat before pressure is released therefrom.

In accordance with the invention, cooking apparatus comprises means for selecting a program subroutine for programming a microcomputer to control a cooking process utilizing a cooking medium. The apparatus also includes parameter-sensor means for sensing a parameter of the cooking medium and means responsive to the parameter-sensor means for determining whether the microcomputer should begin the subroutine. The apparatus also includes register means responsive to the program subroutine for storing timing information relating to the cooking process. The apparatus also includes means responsive to the determining means for decrementing the register means as the cooking process continues and means responsive to the register means for determining whether the cooking process is complete. The apparatus also includes pressure-control means for controlling pressure in the cooking apparatus and second register means responsive to the program subroutine for storing timing information relating to the pressure-control means. The apparatus also includes means for decrementing the second register means as the cooking process continues for causing the second register means to reach zero slightly before the first register means reaches zero. The apparatus also includes means responsive to the second register reaching zero for terminating pressure introduction into the cooking apparatus and for releasing pressure therein slightly before the first register means reaches zero and the cooking cycle is complete.

For a better understanding of the present invention, together with other and further objects thereof, reference is made to the following description, taken in connection with the accompanying drawings, and its scope will be pointed out in the appended claims.

Referring now to the drawings.

Figure 1:
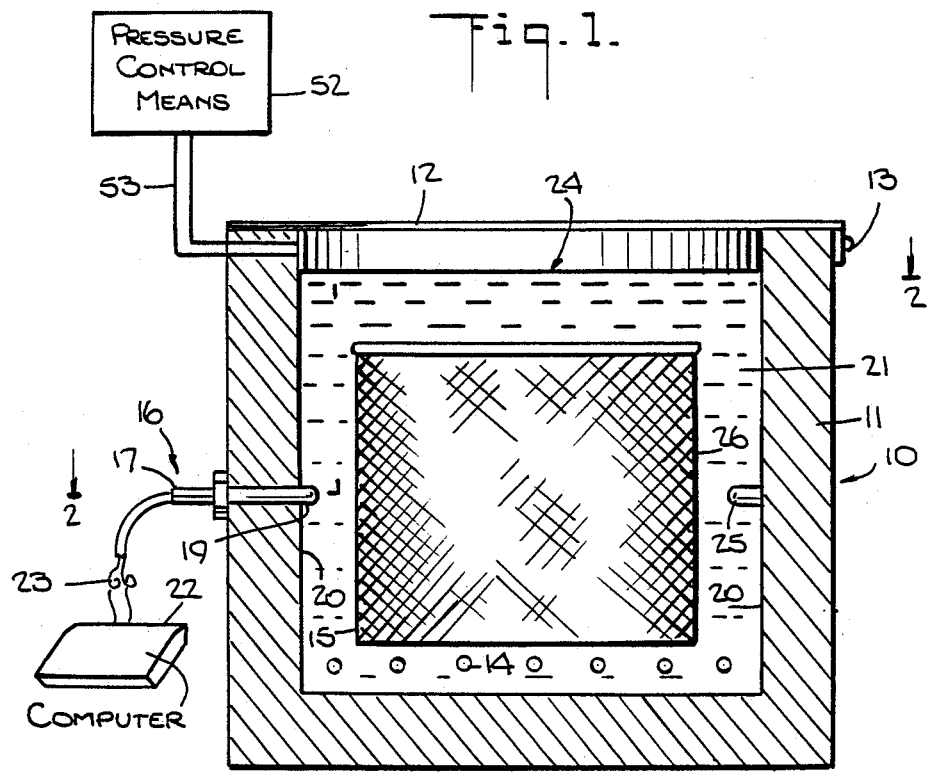
FIG. 1 is a sectional view, partly schematic, of cooking apparatus constructed in accordance with the invention.

Before referring to the drawings in detail, it will be understood that for purposes of clarity, the apparatus represented in block diagrams in FIGS. 1, 2, 3 and 4 utilizes, for example, an analog-to-digital converter and a microprocessor which includes such hardware as a central processing unit, program and random access memories, timing and control circuitry, input-output interface devices and other conventional digital subsystems necessary to the operation of the central processing unit as is well understood by those skilled in the art. The microprocessor operates according to the computer program produced according to the flow chart represented in the drawing.

Figure 2:
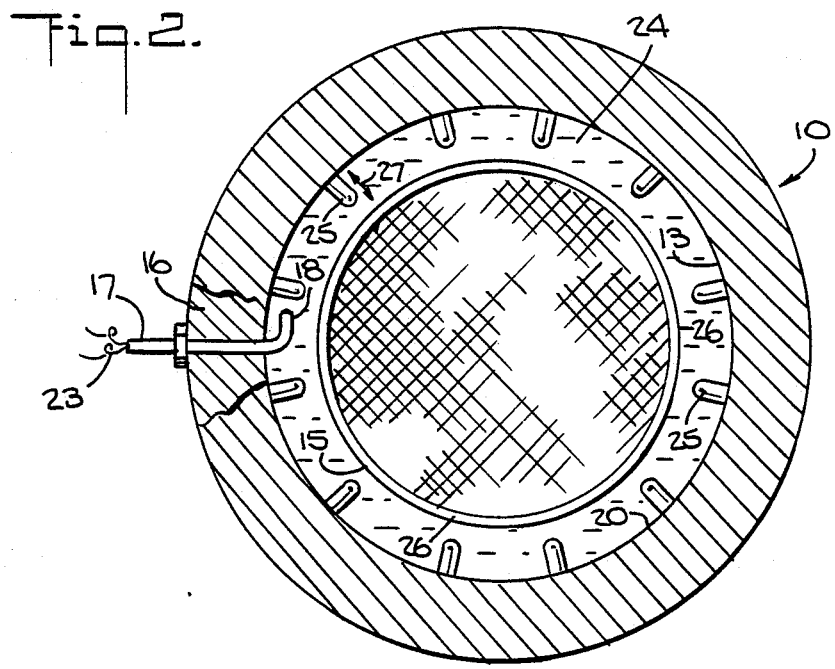
FIG. 2 is a sectional view of a portion of the FIG. 1 apparatus taken along line 2—2 of FIG. 1, with a portion broken away.

Referring now more particularly to FIGS. 1 and 2 of the drawings, cooking apparatus 10 preferably comprises a closable cooking vat 11 having a manually closable lid 12 and a manual latch 13. The cooking vat 11 may, for example, be a deep fat fryer made of metal for heating and holding a cooking medium. The fryer may be cylindrical or of another shape preferably with an electrical or gas heating element 14 i a bottom portion of the vat 11. A food basket 15 for holding food to be fried below a level 24 of a liquid cooking medium 17 preferably is disposed in the center of the fryer. The fryer preferably is a high pressure fryer suitable for use in restaurants providing fast food service.

A temperature probe assembly 16 preferably is made of metal and includes one end portion 17 and an opposite end portion 18. Preferably the probe assembly is in the shape of a "L" as represented in FIGS. 1 and 2 and extends from en portion 17 through a fixed entry port 19 in the internal wall 20 of the fryer into the cooking medium 21, such that the opposite end 18 of the probe 16 is angularly disposed in the medium 21 from the port 19 and forms the base of the "L". A temperature sensing portion 18 is disposed as the opposite end portion of the probe to sense the temperature of the cooking medium along the entire mass of the portion 18 and provide the data to a cooking computer 22 through flexible lead wires 23.

The temperature sensing element 16 preferably is angled in the cooking medium 24 so that no part of the probe 16 touches any internal metal part of the fryer. In particular, the spacing of the sensing element preferably is achieved by providing a length of the element portion 18 of at least twice the distance of the element portion 18 from the internal wall 20 of the fryer.

Deep fat fryers are often equipped with metal spacing elements 25 on the internal wall 20 of the fryer to prevent the metal food basket 26 from colliding with the wall 20. In a preferred embodiment, the probe 16 does not extend into the medium 24 beyond the length of the spacing elements 25 as represented in FIG. 2. Further, the probe is positioned between at least two spacing elements s that no portion of the sensing element 16 touches the members 25 and a heat sink is avoided at the sensing element 16. Thus, the spacing elements protect the probe assembly from damage from the basket heat and at the same time do not for a heat sink to modify the temperature signals provided from the sensing element 16 in the medium 24. The probe assembly is more fully described and claimed in application Ser. No. 119,680, filed Nov. 12, 1987.

Figure 3:
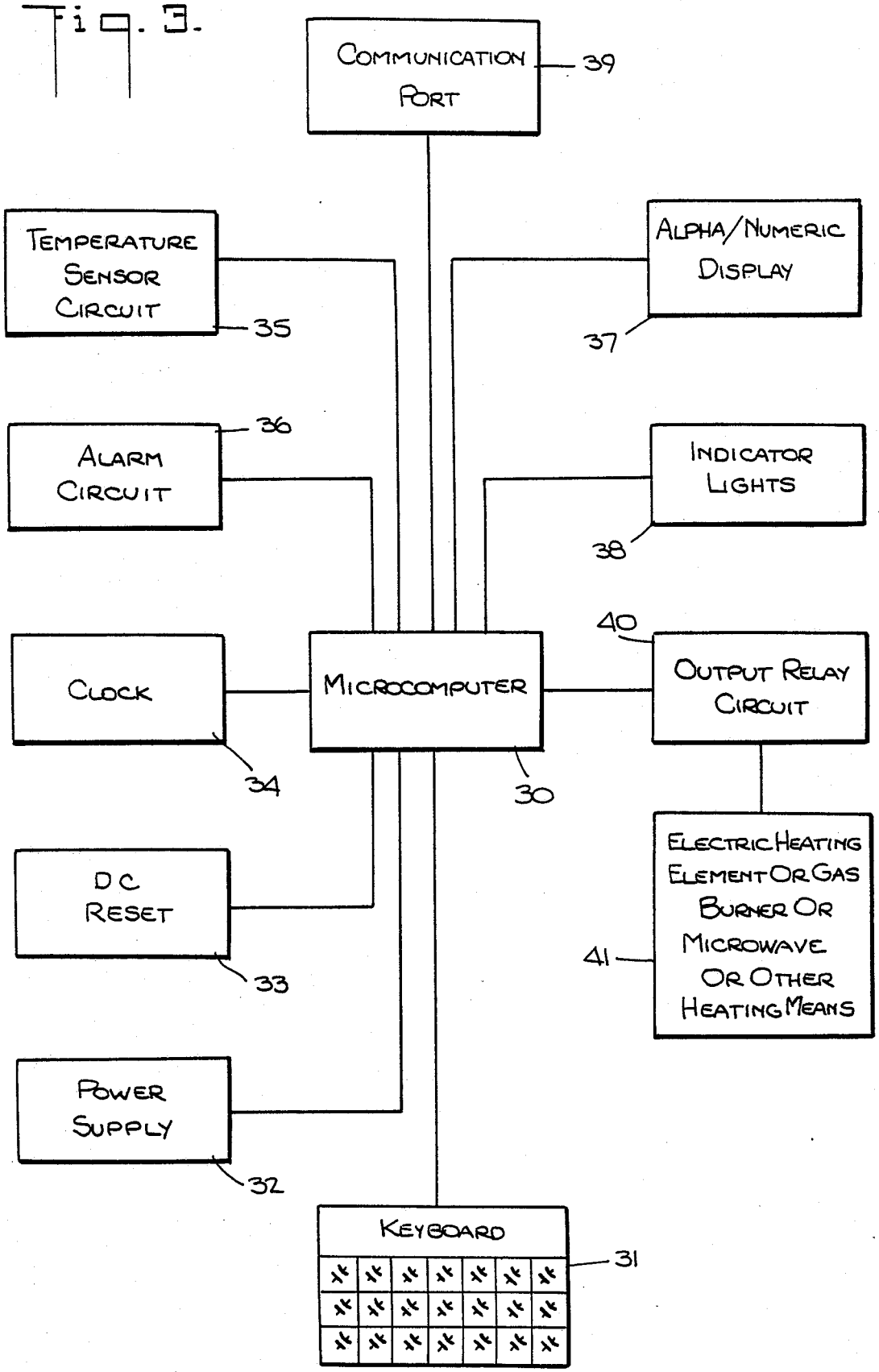
FIG. 3 is a schematic diagram of a portion of the FIG. 1 apparatus.

Referring now more particularly to FIG. 3 of the drawings, there is represented cooking apparatus comprising a microcomputer 30 preferably disposed at the cooking vat. The microcomputer 30 includes a central processing unit which receives an input from a keyboard 31 which may, for example, comprise a capacitive keyboard.

The cooking apparatus includes a conventional power supply 32, a reset circuit 33 for resetting the microcomputer 30 when renewing power in the power supply, a clock oscillator 34 for providing clock pulses to the microcomputer 30, a temperature sensor circuit 35 comprising the probe 16 of FIG. 1 for sensing the temperature within the cooking apparatus, an audible alarm 36, an alpha/numeric display 37 and indicator lights 38. The control system also includes a communication port 39 for the microcomputer 30. The microcomputer 30 controls an output relay circuit 40 which may, for example, control the electrical heating element 14 of the FIG. 1 vat or the gas valves of a burner or microwave or other heating means 14. The communication port 39 is provided for transmitting signals to and from other apparatus. Parameter sensor means for sensing a parameter of the cooking medium comprises the temperature sensor circuit 35.

Figure 4:
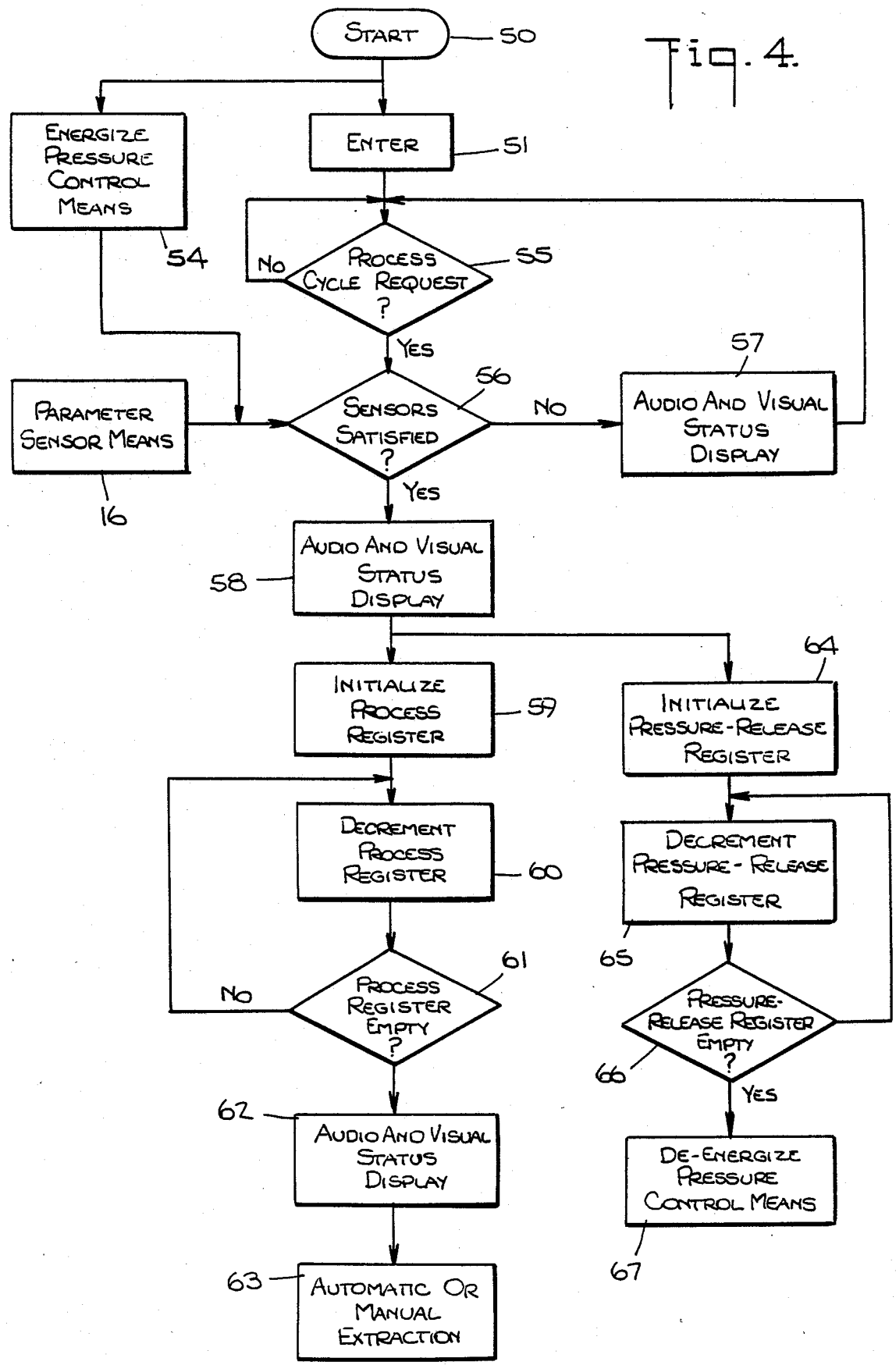
FIG. 4 is a flow chart comprising a representation of a portion of a microcomputer which operates according to a computer program produced according to the flow chart.

Considering now the operation of the cooking apparatus in accordance with the invention, with reference to FIGS. 1, 3 and the flow chart of FIG. 4, the computer 22 comprises the microcomputer 30 and utilizes a conventional start key 50 of the keyboard 31. The apparatus includes means for selecting a program subroutine for programming a microcomputer to control a cooking process utilizing a cooking medium. This means may comprise a "product" key serving as an "enter" key 51. When the "start" key 50 is depressed, a pressure control means 52 (FIG. 1), which may be of conventional solenoid valve construction and utilize piping 53 to the interior of the cooking vat 10, is energized as represented by "energize pressure control means" microprocessor portion 54. The pressure control means allows a pressure of, for example, 6–8 psi to build up in the closed cooking vat.

A "process cycle request?" microprocessor portion 55 is responsive to the "enter" key 51. The "no" output of the "process cycle request" microprocessor portion is coupled to the input of the microprocessor portion 55 and the "yes" output of the microprocessor portion 55 is coupled to a "sensors satisfied?" microprocessor portion 56. The "sensors satisfied?" microprocessor portion 56 is responsive to the parameter sensor means 16 (temperature sensor probe) and to the pressure control means for determining whether the microcomputer should begin the subroutine.

The "no" output of the microprocessor portion 56 is coupled to an audio and visual status display 57 which indicates that the temperature and pressure are not correct and returns control to the "process cycle request?" microprocessor portion 55.

The "yes" output of the microprocessor portion 56 is coupled to an audio and visual status display 58 which indicates that the temperature and pressure sensors are satisfied and is coupled to register means responsive to the program subroutine for storing timing information relating to the cooking process. This register means includes an "initialize process register" microprocessor portion 59 having an output coupled to a "decrement process register" microprocessor portion 60. The microprocessor portion 60 is coupled to a "process register empty?" microprocessor portion 61 having its "no" output returned to the microprocessor portion 60 for decrementing the register means as the cooking process continues. Means responsive to the register means for determining whether the cooking process is complete comprises the microprocessor portion 61 which has its "yes" output coupled to an audio and visual status display 62 to indicate that cooking is "done". The cooking basket and food may then be automatically or manually extracted from the cooking vat as indicated by "automatic or manual extraction" block 63 of the flow chart.

The microcomputer includes second register means responsive to the program subroutine for storing timing information relating to the pressure-control means. The second register means includes an "initialize pressure release register" microprocessor portion 64 coupled to a "decrement pressure release register" microprocessor portion 65. Means for decrementing the second register means as the cooking process continues for causing the second register means to reach zero slightly before the first register means reaches zero comprises the microprocessor portion 65.

The microprocessor portion 65 is coupled to a "pressure-release register empty?" microprocessor portion 66 having its "no" output coupled to the microprocessor portion 65 for decrementing the second register means as the cooking process continues for causing the second register means to reach zero slightly before the first register means reaches zero.

Means responsive to the second register means reaching zero for terminating pressure introduction into the apparatus and for releasing pressure therein slightly before the first pressure means reaches zero and the cooking cycle is complete comprises the "yes" output of the microprocessor portion 66 coupled to a "de-energize pressure control means" microprocessor portion 6.. The pressure control means preferably terminates pressure introduction and preferably releases pressure through a suitable vent (not shown) in the cooking apparatus within, for example, 60 seconds before the cooking cycle is complete. If the pressure is released too soon, cooking is not completed properly.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Cooking apparatus comprising:
   means for selecting a program subroutine for programming a microcomputer to control a cooking process utilizing a cooking medium;
   parameter-sensor means for sensing a parameter of the cooking medium;
   means responsive to said parameter-sensor means for determining whether the microcomputer should begin the subroutine;
   register means responsive to said program subroutine for storing timing information relating to the cooking process;

means responsive to said determining means for decrementing said register means as the cooking process continues;

means responsive to said register means for determining whether the cooking process is complete;

pressure-control means for controlling pressure in the cooking apparatus;

second register means responsive to said program subroutine for storing timing information relating to said pressure-control means;

means for decrementing said second register means as the cooking process continues for causing said second register means to reach zero slightly before said first register means reaches zero means responsive to said second register reaching zero for terminating pressure introduction into the cooking apparatus and for releasing pressure therein slightly before said first register means reaches zero and the cooking cycle is complete.

2. Cooking apparatus in accordance with claim 1 in which said parameter-sensor means comprises means for sensing the temperature of the cooking medium.

3. Cooking apparatus in accordance with claim 1 in which said pressure-control means maintains pressure in the cooking apparatus during approximately an entire cooking cycle.

4. Cooking apparatus in accordance with claim 1 in which said pressure control means terminates pressure introduction and releases pressure in the cooking apparatus within sixty seconds before the cooking cycle is complete.

5. Cooking apparatus in accordance with claim 1 which includes a closable cooking vat.

* * * * *